United States Patent
Klein et al.

(10) Patent No.: US 7,141,307 B2
(45) Date of Patent: Nov. 28, 2006

(54) EXTRUSION-COATABLE POLYESTER FILM COMPRISING POLY(M-XYLENEADIPAMIDE)

(75) Inventors: Oliver Klein, Mainz (DE); Herbert Peiffer, Mainz (DE); Matthias Konrad, Hofheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 11/152,634

(22) Filed: Jun. 14, 2005

(65) Prior Publication Data
US 2005/0287382 A1    Dec. 29, 2005

(30) Foreign Application Priority Data
Jun. 26, 2004  (DE) ............... 10 2004 030 979

(51) Int. Cl.
B32B 27/08  (2006.01)
B32B 27/16  (2006.01)
B32B 27/34  (2006.01)
B32B 27/36  (2006.01)
B29C 55/12  (2006.01)

(52) U.S. Cl. ............... 428/447; 428/343; 428/355 R; 428/446; 428/474.4; 428/475.2; 428/475.5; 428/480; 428/483; 428/910; 525/418; 525/420; 525/425; 264/288.4; 264/289.3; 264/289.6; 264/290.2

(58) Field of Classification Search .............. None
See application file for complete search history.

(56) References Cited

U.S. PATENT DOCUMENTS

| | | | |
|---|---|---|---|
| 2,627,088 A | 2/1953 | Alles et al. | 18/47.5 |
| 2,698,240 A | 12/1954 | Alles et al. | 95/9 |
| 4,214,035 A | 7/1980 | Heberger | |
| 4,252,885 A | 2/1981 | McGrail et al. | 430/160 |
| 4,898,786 A * | 2/1990 | Swofford | 428/480 |
| 4,939,035 A * | 7/1990 | Swofford | 428/341 |
| 5,064,722 A * | 11/1991 | Swofford et al. | 428/447 |
| 5,082,738 A * | 1/1992 | Swofford | 428/437 |
| 2004/0081840 A1* | 4/2004 | Kiehne et al. | 428/482 |
| 2004/0146718 A1* | 7/2004 | Konrad et al. | 428/424.4 |
| 2004/0146725 A1* | 7/2004 | Konrad et al. | 428/475.2 |
| 2004/0146727 A1* | 7/2004 | Klein et al. | 428/480 |

(Continued)

FOREIGN PATENT DOCUMENTS

EP    0 049 108 A1    4/1982

(Continued)

OTHER PUBLICATIONS

Schimtz, Peter et al., "Films." Ullmann's Encyclopedia of Industrial Chemistry, 5th Ed., vol. A11 (1988), pp. 85-95, 105-106, 108-110.*

(Continued)

*Primary Examiner*—Vivian Chen
(74) *Attorney, Agent, or Firm*—ProPat, L.L.C.

(57) ABSTRACT

Polyester films which comprise not only thermoplastic polyester, e.g. polyethylene terephthalate, but also from 5 to 45% by weight of poly(m-xyleneadipamide) and optionally from 0.02 to 1% by weight of fillers, and which have, on at least one surface, an adhesion-promoting layer comprised of a hydrolyzed amino-functional silane. The films of the invention are produced by a sequential stretching process, and feature improved mechanical properties, such as a modulus of elasticity greater than 3500 N/mm$^2$ in both orientation directions, high gloss, low haze, and very good barrier properties with respect to oxygen transmission. Films of the invention are therefore a suitable packaging material for foods and other consumable items, and as starting material for production of laminates via extrusion coating.

28 Claims, 1 Drawing Sheet

U.S. PATENT DOCUMENTS

| | | | |
|---|---|---|---|
| 2004/0146750 A1* | 7/2004 | Klein et al. | 428/694 SG |
| 2005/0100729 A1* | 5/2005 | Peiffer et al. | 428/323 |

FOREIGN PATENT DOCUMENTS

| | | |
|---|---|---|
| EP | 0 144 878 A2 | 6/1985 |
| EP | 0 144 948 A2 | 6/1985 |
| EP | 0 296 620 A2 | 12/1988 |
| EP | 0359 017 A2 | 3/1990 |
| EP | 0 602 964 A1 | 6/1994 |
| EP | 0 675 158 A2 | 10/1995 |
| GB | 1411564 | 10/1975 |
| JP | 2001-001399 | 1/2001 |
| WO | WO 94/13476 A1 | 6/1994 |
| WO | WO 94/13481 A1 | 6/1994 |
| WO | WO 99/62694 A1 | 12/1999 |

OTHER PUBLICATIONS

Werner, Eberhard et al., "Polyester, Films." Encyclopedia of Polymer Science and Engineering, vol. 12 (1988), pp. 193-216.*

* cited by examiner

EXTRUSION-COATABLE POLYESTER FILM COMPRISING POLY(M-XYLENEADIPAMIDE)

CROSS-REFERENCE TO RELATED APPLICATIONS

This application claims priority to German parent application 10 2004 030 979.5, which is hereby incorporated by reference in its entirety.

FIELD OF THE INVENTION

The invention relates to a transparent, biaxially oriented polyester film which comprises poly(m-xyleneadipamide) and which has been coated on at least one side with an adhesion-promoting layer composed of a hydrolyzed aminofunctional silane. The adhesion-promoting coating makes the film receptive to subsequent extrusion coating with other polymers (e.g. polyolefins). The invention further relates to the use of the film and to a process for its production.

BACKGROUND OF THE INVENTION

Biaxially oriented polyester films (e.g. biaxially oriented polyethylene terephthalate=BOPET) are increasingly used as packaging material, e.g. for food or drink, for pet food, or for detergent. Their characteristic properties for this application sector are their high optical transparency, their high gloss, and their high mechanical strength. The films mentioned also feature good barrier properties, in particular with respect to transmission of oxygen. In many applications, it is desirable for the film to provide a barrier better than that provided by BOPET. Examples here are the packaging of cheese, of coffee, of herbs and spices, or of baby foods, to mention just a few examples.

In most cases, BOPET is processed to give a laminate with other polymers (PE, PP), with paper/cardboard, or with other films or foils (e.g. BOPP, aluminum). To produce this laminate, the PET film is often extrusion-coated, using polyolefins, e.g. PE, PP, or ethylene-propylene copolymer. This is a technically simple way of obtaining the desired properties of the laminate, e.g. hot-sealability, good adhesion to other materials (e.g. to aluminum foil), or additional desired stiffness via the thick PE layer applied by extrusion (PE=polyethylene, PP=polypropylene).

However, a PET surface which has not been pretreated is not receptive to extrusion coating with polyolefins. In conventional extrusion coating, the processor will corona-treat the PET film supplied by the producer, coat the corona-treated film with an adhesion-promoting layer, dry the layer, and then extrusion-coat the material with another polymer. The necessity of coating the film with an adhesion-promoting layer implies an additional processing step, which demands expensive additional machinery and causes yield losses.

Biaxially oriented polyesterfilms which have a coating that promotes adhesion to various materials on at least one of their two surfaces are known in the prior art.

EP-A-0 359 017 describes an oriented film comprised of thermoplastic and having, on at least one of its two surfaces, an adhesion-promoting layer comprised of a hydrolyzed amino-functional silane, this layer being applied in the form of an aqueous dispersion to the film. The description of the adhesion-promoting layer says that it is comprised of a dried residue of a hydrolyzed aminosilane compound whose unhydrolyzed form has the following formula:

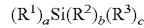

$R^1$ is a functional group having at least one primary amino group, $R^2$ is a hydrolyzable group selected either from short-chain alkoxy groups having from 1 to 8 carbon atoms or from an acetoxy group or from a halide, and $R^3$ is an unreactive, non-hydrolyzable group, either a short-chain alkyl group having from 1 to 8 carbon atoms or a phenyl group. (a) here is greater than or equal to 1; (b) is greater than or equal to 1, and (c) is greater than or equal to 0, and the rule here is that a+b+c=4. The application weight at which this adhesion-promoting layer is applied to the PET film is such that it improves adhesion to polyolefins, applied via extrusion coating. Disadvantages of the film are its optical properties, such as transparency or gloss, and also its barrier properties, in particular with respect to transmission of oxygen. Because of these disadvantages, this film is not used in high-performance packaging applications (cheese, herbs and spices).

Transparent, biaxially oriented polyester films which feature improved barrier properties are likewise known from the prior art. In most instances, the films acquire their improved barrier properties off-line after the production process via a further processing step. Examples here are extrusion coating, coating or lamination with barrier materials, in-vacuo coating with metals or with ceramic substances, or plasma polymerization in combination with vacuum coating.

An exception here is the process described in more detail in WO 99/62694, in which a multilayer, coextruded polyester film which comprises at least one layer comprised of EVOH (ethylene-vinyl alcohol) is simultaneously biaxially oriented. This film features good mechanical properties, and in particular features good barrier properties with respect to transmission of oxygen. The best value given for achievable oxygen transmission OTR (oxygen transmission rate) in the specification are 5 $cm^3/(m^2 \cdot bar \cdot d)$. The disadvantage of the process, inter alia, is that regrind produced during the production process cannot be reintroduced into the production process without sacrificing the good optical and physical properties of the film.

Another exception is the biaxially oriented film described in JP 2001-001399, which is comprised of a mixture of polyethylene terephthalate and poly(m-xyleneadipamide) (MXD6). The proportion of poly(m-xyleneadipamide) (MXD6) in the film is from 10 to 40% by weight, and the corresponding proportion of polyethylene terephthalate is from 60 to 90% by weight. According to the invention, the film is simultaneously biaxially oriented. The specification gives the following data for the stretching parameters: The stretching ratios in both directions are from 2.5 to 5.0. However, in the examples the film is only oriented by a factor 3.0 in the machine direction and by a factor of 3.3 transversely to the machine direction. The overall stretching ratio is therefore 9.9. The stretching temperatures in both directions are from 80 to 140° C. In the examples, the film is stretched in both directions at 90° C.

According to JP 2001-001399, when a simultaneously oriented film is compared with a sequentially oriented film (e.g. oriented first in machine direction (MD or MDO) and then in the transverse direction (TD or TDO)), it has lower haze and gives more dependable processing, i.e. can be produced with a smaller number of break-offs in the second stretching phase (e.g. in the transverse direction). According to the above specification, the degree of crystallization that occurs during the sequential (non-inventive) orientation in the first stretching step (e.g. MDO) is so great that the film becomes cloudy during the second (subsequent) orientation process and becomes more delicate with respect to any further orientation process. According to the (comparative) Examples 3 and 4 set out in the specification, a polyester film with from 10 to 40% of MXD6 cannot be produced by the sequential process, because it tears in the second stretching phase.

The biaxially oriented films produced according to JP 2001-001399 by the simultaneous process feature low haze, but in particular feature good barrier action with regard to oxygen permeation. The film achieves an oxygen transmission OTR smaller than 30 cm/(m$^2$·bar·d). According to the invention, the haze of the film is smaller than 15%. However, the film has a number of disadvantages:

It has a comparatively low level of mechanical properties. In particular, the modulus of elasticity and the ultimate tensile strength are unsatisfactory.

It tends to block and is therefore difficult to wind.

It has comparatively rough surfaces. The film also has a matt appearance, undesirable for many applications. It is therefore also comparatively difficult to print, to metallize, or to coat.

SUMMARY OF THE INVENTION

It was therefore an object of the present invention to provide a biaxially oriented polyester film which firstly features very good barrier properties (at least with respect to transmission of oxygen), and which, without further operations, is extrusion-coatable with polyolefins.

When compared with films of the prior art, the film should also have the following advantageous properties/combinations of properties:

a higher level of mechanical properties, in particular higher modulus of elasticity, higher gloss and therefore good printability, good metallizability, and good coatability, good windability (without blocking), and capability of processing to give a customer roll without winding defect, capability for cost-effective production; meaning, for example, that the film can be produced industrially by conventional stretching processes which can operate at high speed, e.g. above 350 m/min (above 400 m/min); there should be no need to resort to the simultaneous stretching process, which is expensive and according to the prior art operates at markedly lower speed (<350 m/min) and width (<5 m) and is therefore less cost-effective, direct extrusion-coatability with polyolefins, without needing to undergo any further processing step (e.g. corona treatment, application of an adhesion-promoting layer) for this purpose, after its production.

During production of the film, it is to be possible to reintroduce into the production process (extrusion and biaxial orientation) an amount which is preferably from 5 to 60% by weight of the regrind produced, without any significant resultant adverse effect on the physical and optical properties of the film (e.g. avoidance of any marked yellowing), and in particular barrier properties with respect to oxygen.

DETAILED DESCRIPTION OF THE INVENTION

Figure 1:
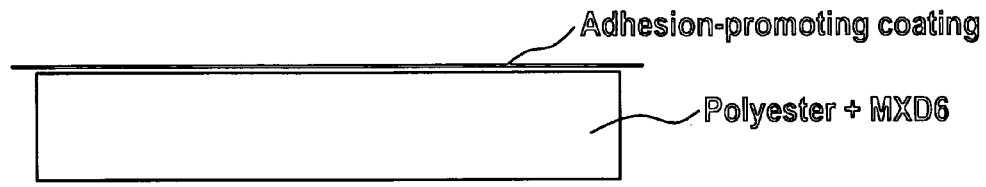
FIG. 1 is a cross-sectional schematic illustration of an exemplary single layer film in accordance with the invention.

The object is achieved via a biaxially oriented and transparent polyester film, preferably produced by the sequential stretching process, which comprises a concentration which is preferably from 5 to 45% by weight of poly(m-xyleneadipamide) (MXD6), has a modulus of elasticity of at least 3500 N/mm$^2$ in both orientation directions (MD and TD), where at least one of the two film surfaces has been coated with an adhesion-promoting layer comprised of a hydrolyzed amino-functional silane.

The film comprises a concentration which is preferably from 0.02 to 1% by weight of fillers.

To produce the adhesion-promoting layer, it is preferable to use an aqueous dispersion of the silane.

Surprisingly, it has been found that use of this adhesion-promoting layer comprised of a hydrolyzed amino-functional silane and of MXD6 as additional polymer to the polyester could improve not only the barrier but also the mechanical properties of the film, without any resultant impairment of the excellent optical properties of the film. Unexpectedly, it has also been found that the excellent optical properties of the film are not impaired even when the regrind produced (which may comprise portions of the adhesion-promoting layer) is used as in-process regrind for production of the film.

According to the invention, the film has a structure comprising at least one layer and is then comprised merely of the base layer B. At least one of the two surfaces of the film bears the adhesion-promoting layer D, which is preferably applied in the form of an aqueous dispersion to the film. In another embodiment, the film of the present invention has a three-layer structure, and then encompasses a base layer B and the two outer layers A and C, which may be identical or different. In one particularly preferred embodiment, the film of the present invention has a three-layer structure, and then encompasses a base layer B and the two outer layers A and C, the two outer layers A and C having the same formulation (ABA variant of three-layer embodiment).

The film comprises a thermoplastic polyester, the amount of which is preferably at least 55% by weight. The proportion of poly(m-xyleneadipamide) in the film is preferably from 5 to 45% by weight, in particular from 5 to 40% by weight, based on the weight of the entire film.

Unless otherwise stated, all % by weight data are based on the total weight of the inventive film.

Poly(m-xyleneadipamide) (MXD6), also termed poly-m-xylyleneadipamide or PA-MXD6, is a polycondensate (polyarylamide) comprised of m-xylylenediamine and adipic acid, and is marketed in various grades, all of which are in principle suitable for the inventive purpose. However, preference is given to grades whose melt viscosity is smaller than 6000 poise (=600 Pa.s, T=280° C., shear rate $Y_{point} \geq 100$ s$^{-1}$).

When compared with films of the prior art, the biaxially oriented, transparent polyester film of the present invention has improved mechanical and improved optical properties, and also in particular higher gloss. The film moreover features excellent barrier properties, in particular with respect to transmission of gases, e.g. oxygen.

The oxygen transmission (OTR) of the film is preferably smaller than 45 cm$^3$/(m$^2 \cdot$d$\cdot$bar), preferably smaller than 40 cm$^3$/(m$^2 \cdot$d$\cdot$bar), and particularly preferably smaller than 30 cm$^3$/(m$^2 \cdot$d$\cdot$bar); based on a film of thickness 12 µm.

The film also exhibits the desired processing behavior and winding behavior. In particular, it exhibits no tendency to stick to rollers or to other mechanical parts, no blocking problems, and no longitudinal corrugations on winding. The film can therefore readily produce a customer roll with very good winding quality.

Figure 2:
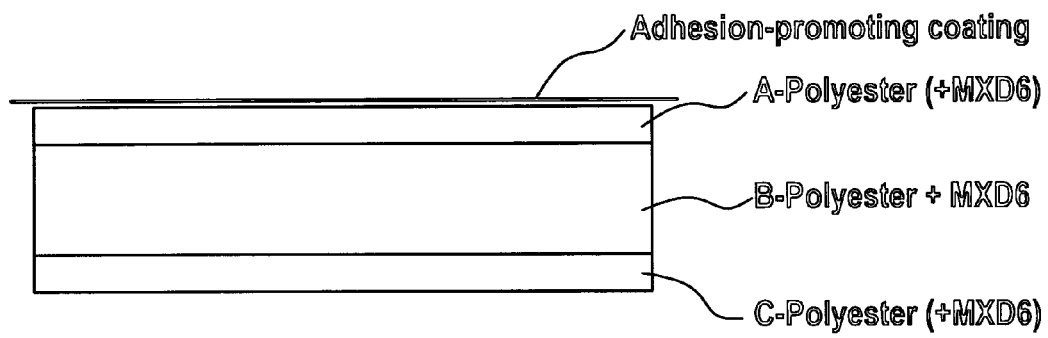
FIG. 2 is a cross-sectional schematic illustration of an exemplary three layer film in accordance with the invention.

The film of the present invention is preferably comprised of the inventive polymer mixture. In this case, the film has a single-layer structure (cf. FIG. 1). In another inventive embodiment, the film has a multilayer structure, for example a three-layer structure (cf. FIG. 2). It is then comprised, by way of example, of the inventive base layer (B), of the outer layer (A) applied on one side of the base layer (B), and also of the outer layer (C) applied on the other side of the base layer (B). The layers (A) and (C) may be identical or different.

The film, or the base layer of the film, is preferably comprised of at least 55% by weight of thermoplastic polyester (=component I). Examples of materials suitable for this are polyesters comprised of ethylene glycol and terephthalic acid (polyethylene terephthalate, PET), ethylene glycol and naphthalene-2,6-dicarboxylic acid (polyethylene 2,6-naphthalate, PEN), 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Preference is given to polyesters comprised of at least 90 mol %, in particular at least 95 mol %, of ethylene glycol units and terephthalic acid units, or of ethylene glycol units and naphthalene-2,6-dicarboxylic acid units. The remaining monomer units derive from other diols or other dicarboxylic acids. For component I of the film, or of the base layer (B), it is also advantageously possible to use copolymers or mixtures or blends comprised of the homo- and/or copolymers mentioned.

For the last-mentioned case it is particularly advantageous for the component I used in the film or in the base layer (B) to comprise a polyester copolymer based on isophthalic acid and terephthalic acid or based on terephthalic acid and naphthalene-2,6-dicarboxylic acid. In this case, the film is easy to produce and the optical properties of the film are particularly good, as also are the barrier properties achieved in the film. One particular advantage is that if, for example, a polyester copolymer based on isophthalic acid and terephthalic acid is used the extrusion temperature can be lowered, and this is particularly advantageous for processing of the MXD6. If, by way of example, 280° C. is required for the extrusion of polyethylene terephthalate, the extrusion temperature can be lowered to below 260° C. if a polyester copolymer based on isophthalic acid terephthalic acid is used. The MXD6 then remains ductile for the stretching phase that follows, and this is discernible, by way of example, in high process stability and in very good mechanical properties.

In this case, component I of the film or of the base layer (B) of the film in essence comprises a polyester copolymer comprised predominantly of isophthalic acid units and of terephthalic acid units and of ethylene glycol units, and component II of the film comprises in essence the above-mentioned inventive poly(m-xyleneadipamide) (MXD6). However, mixtures comprised of polyethylene terephthalate and polyethylene isophthalate are also preferred as component I.

The preferred copolyesters (component I), which provide the desired properties of the film (in particular the optical properties, together with orientability) are those comprised of terephthalate units and of isophthalate units, and of ethylene glycol units. The proportion of ethylene terephthalate in these copolymers is preferably from 70 to 98 mol %, and the corresponding proportion of ethylene isophthalate is from 30 to 2 mol %. Among these, preference is in turn given to those copolyesters in which the proportion of ethylene terephthalate is from 76 to 98 mol %, and the corresponding proportion of ethylene isophthalate is from 24 to 2 mol %, and very particular preference is given to those copolyesters in which the proportion of ethylene terephthalate is from 80 to 98 mol % and the corresponding proportion of ethylene isophthalate is from 20 to 2 mol %.

Examples of other aliphatic diols which may be constituents of the inventive polyesters are diethylene glycol, triethylene glycol, aliphatic glycols of the formula HO—(CH$_2$)$_n$—OH, where n is an integer from 2 to 6 (in particular 1,3-propanediol, 1,4-butanediol, 1,5-pentanediol and 1,6-hexanediol) and branched aliphatic glycols having up to 6 carbon atoms, and cycloaliphatic diols having one or more rings and, if appropriate, containing heteroatoms. Among the cycloaliphatic diols, mention should be made of cyclohexanediols (in particular 1,4-cyclohexanediol). Examples of other suitable aromatic diols have the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also very suitable.

Suitable other aromatic dicarboxylic acids which may be constituents of the inventive polyesters are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylicacids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the C$_3$–C$_{19}$ alkanediacids are particularly suitable, and the alkane moiety here may be straight-chain or branched.

One way of preparing these polyesters according to the invention is the known transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well known polycondensation catalysts, such as antimony trioxide or titanium salts. Another equally good preparation method is the direct esterification process in the presence of polycondensation catalysts. This starts directly from the dicarboxylic acids and the diols. The inventive polyesters are moreover obtainable from various producers.

According to the invention, the base layer (B) or the film comprises an amount of in particular from 5 to 40% by weight and particularly preferably from 5 to 35% by weight of poly(m-xyleneadipamide) (MXD6) (=component II) as another component.

For the processing of the polymers it has proven advantageous for the poly(m-xyleneadipamide) (MXD6) to be selected in such a way that the viscosities of the respective polymer melts do not differ excessively. Otherwise, additional elevations/protrusions, flow disruption, or streaking on the finished film can sometimes be expected. Furthermore, the polymers then tend to separate. In accordance with the experiments carried out here, the melt viscosity of the poly(m-xyleneadipamide) (MXD6) should preferably be below certain values. For the purposes of the present invention, very good results are obtained if the melt viscosity of the MXD6 is smaller than 6000 poise (measured in a capillary rheometer of diameter 0.1 mm, of length 10 mm, and with a shear rate of $Y_{point} \geq 100$ s$^{-1}$, melt temperature 280° C.), preferably smaller than 5000 poise, and particularly preferably smaller than 4000 poise.

Similar factors also apply to the viscosity of the polyester used. For the purposes of the present invention, very good results are obtained if the melt viscosity of the polyester is smaller than 2400 poise (measured in a capillary rheometer of diameter 0.1 mm, of length 10 mm, and with a shear rate of $Y_{point} \geq 100$ s$^{-1}$, melt temperature 280° C.), preferably smaller than 2200 poise, and particularly preferably smaller than 2000 poise.

The form in which the poly(m-xyleneadipamide) (MXD6) is incorporated into the film is advantageously either that of pure pelletized material or that of pelletized concentrate (masterbatch). In the case of processing by way of a masterbatch, its concentration is preferably from 10 to 60% by weight of MXD6. To this end, the pelletized polyester is premixed with the poly(m-xyleneadipamide) (MXD6) or with the poly(m-xyleneadipamide) (MXD6) masterbatch, and then introduced into the extruder. In the extruder, the components are further mixed and heated to processing temperature. It is advantageous here for the inventive process if the extrusion temperature is above the melting point $T_M$ of the poly(m-xyleneadipamide) (MXD6), generally above the melting point of the poly(m-xyleneadipamide) (MXD6) by at least 5° C., preferably by from 5 to 50° C., in particular however by from 5 to 40° C. A twin-screw extruder is clearly a preferred extrusion unit for the processing of the mixture, and also for the preparation of the masterbatch from components I and II. Another factor which should be mentioned is that good results are achieved even with a single-screw extruder, and therefore that this principle is generally applicable.

For the outer layers, and for any intermediate layers present, it is in principle possible to use polymers identical with those used for the base layer B. However, other materials may also be present in these other layers, and these layers are then preferably comprised of a mixture of polymers, of copolymers, or of homopolymers, the mixture preferably comprising ethylene isophthalate units and/or ethylene 2,6-naphthalate units, and/or ethylene terephthalate units. Up to 10 mol % of the polymers may be comprised of other comonomers.

(Polyester) copolymers or (polyester) mixtures, or blends comprised of homo- and/or copolymers may also be used with advantage as other components in these other layers.

It is particularly advantageous to use a polyester copolymer based on isophthalic acid and terephthalic acid in the outer layer (C) and/or (A). In this case, the optical properties of the film are particularly good.

In this case, the outer layer (C) and/or (A) of the film in essence comprises a polyester copolymer comprised mainly of isophthalic acid units and of terephthalic acid units, and of ethylene glycol units. The remaining monomer units derive from the other aliphatic, cycloaliphatic, or aromatic diols and, respectively, other carboxylic acids which may also occur in the base layer. The preferred copolyesters which provide the desired properties of the film (in particular the optical properties) are those comprised of terephthalate units and of isophthalate units, and of ethylene glycol units. The proportion of ethylene terephthalate is preferably from 40 to 97 mol %, and the corresponding proportion of ethylene isophthalate is preferably from 60 to 3 mol %. Preference is given to copolyesters in which the proportion of ethylene terephthalate is from 50 to 90 mol % and the corresponding proportion of ethylene isophthalate is from 50 to 10 mol %, and a particularly preference is given to copolyesters in which the proportion of ethylene terephthalate is from 60 to 85 mol % and the corresponding proportion of ethylene isophthalate is from 40 to 15 mol %.

In another embodiment, the outer layer (C) and/or (A) also comprises, as another component, poly(m-xyleneadipamide) (MXD6) (=component II), its amount preferably being from 0 to 80% by weight, in particular from 2 to 60% by weight, and particularly preferably from 4 to 40% by weight, based on the weight of the respective outer layer.

The thickness of the outer layers is preferably greater than 0.5 μm, and is preferably in the range from 1.2 to 20 μm, and particularly preferably in the range from 1.5 to 10 μm.

The base layer (B) and any outer and intermediate layers present may also comprise conventional additives, e.g. stabilizers and/or antiblocking agents. They are advantageously added to the polymer or polymer mixture before melting begins. Examples of stabilizers used are phosphorus compounds, such as phosphoric acid or phosphoric esters.

Typical antiblocking agents (also termed pigments or fillers in this context) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc, or manganese salts of the dicarboxylic acids used, carbon black, titanium dioxide, kaolin, or crosslinked polystyrene particles, or crosslinked acrylate particles.

Other additives which may be selected are mixtures of two or more different antiblocking agents or mixtures of antiblocking agents of the same constitution but different particle size. The particles may be added to the individual layers in conventional concentrations, e.g. in the form of a glycolic dispersion during the polycondensation process, or by way of masterbatches during the extrusion process (or else in the form of "direct additive addition" [DAA] directly into the extruder during the extrusion process).

According to the invention, the film comprises fillers at a concentration which is preferably from 0.02 to 1% by weight, and preferably comprises fillers at a concentration of from 0.04 to 0.8% by weight, and particularly preferably comprises fillers at a concentration of from 0.06 to 0.6% by weight, based on the weight of the film. (EP-A-0 602 964 gives by way of example a detailed description of suitable fillers and suitable antiblocking agents.)

If the concentration is less than 0.02% by weight, the film can block and then, by way of example, can no longer be wound. If, in contrast, the concentration is more than 1.0% by weight, the film sometimes loses its high transparency and becomes cloudy, and cannot then be used as a packaging film, for example.

In one preferred embodiment of the invention, the proportion of filler in the outer layers (A and/or C) is less than 0.6% by weight, preferably less than 0.5% by weight, and particularly preferably less than 0.4% by weight, based on the weight of the respective outer layer.

According to the invention, at least one side (surface) of the film has been coated with a hydrolyzable amino-functional silane. The thickness of the coating on the finished film is from 5 to 2000 nm, preferably from 10 to 1000 nm, in particular from 20 to 500 nm. The coating is preferably applied in-line, i.e. during the film-production process, advantageously prior to the transverse stretching process. It is particularly preferable to apply the coating by means of the reverse gravure-roll coating process, which can apply the coatings in extremely homogeneous fashion. Preference is also given to application of the coating via the Meyer rod process, which can achieve relatively high coating thicknesses.

This adhesion-promoting layer is comprised of a hydrolyzed amino-functional silane, which makes the film receptive to direct extrusion coating with polymers.

The amino-functional silane is generally hydrolyzed in water and applied to one or more surfaces of the oriented polyester by conventional methods, such as spray coating or roll coating. Once the silane coating has been dried, the polyester thus primed is receptive to direct extrusion using one or more polymers. A conventional process may be used for extrusion coating. The adhesion-promoting layer serves to bind the polyester film to the extrudate, the resultant entire product being a laminate.

In the widest sense, the object of the present invention is therefore an oriented polyester film which has an effective amount of an adhesion-promoting layer in order to permit the film to be receptive to direct extrusion coating with one or more polymers.

The invention therefore also encompasses a laminate comprised of an oriented polyester film, of at least one adhesion-promoting layer, and of one or more polymers extruded onto this/these layer(s).

After hydrolysis, silanes are water-soluble or water-dispersible, and amino-functional silanes have particularly good water-solubility here. It has been found that aminosilanes provide good adhesion of extrusion-coated polymers to polyester films without any additional adhesion-promoting layer or corona treatment. The cut material comprising polyester film with aminosilane coating can be used as regrind.

Preferred amino-functional silanes which are utilized for the purposes of this invention are described by the following formula:

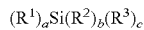

where $R^1$ is a functional group having at least one primary amino group, $R^2$ is a hydrolyzable group selected either from short-chain alkoxy groups having from 1 to 8 carbon atoms or from an acetoxy group or from a halide, and $R^3$ is an unreactive, non-hydrolyzable group, preferably either a short-chain alkyl group having from 1 to 8 carbon atoms or a phenyl group. a here is greater than or equal to 1; b is greater than or equal to 1, and c is greater than or equal to 0, and $a+b+c=4$.

Examples of aminosilanes which comply with this formula are N-2-(aminoethyl)-3-aminopropyltrimethoxysilane, 3-aminopropyltrimethoxysilane, 4-aminobutyltriethoxysilane, 4-aminobutyidimethylmethoxysilane, and p-aminophenyltrimethoxysilane. The preferred silane is N-2-(aminoethyl)-3-aminopropyltrimethoxysilane of the following formula:

The hydrolyzed aminosilane may in principle be applied at any possible juncture during the production of the film, i.e. prior to or during the stretching process, and it can also be applied to the finished film (by way of example) prior to wind-up. The resultant "primed" polyester film has particularly good adhesion to extrusion-coated polymeric materials or films. The adhesion-promoting layer is prepared from a mixture of aminosilane, or of various aminosilanes, with water in a range which is preferably from 0.2 to 6% by weight.

A weak acid, e.g. acetic acid, may optionally be added in order to promote the hydrolysis process. At least one of the hydrolyzable groups of the silane is hydrolyzed to give a silanol group (SiOH). It is assumed that the hydrolysis product of the aminosilane has a partially hydrolyzed cyclic structure, where the amino group probably forms ionic bonds to the silicon moiety of the molecule. The term hydrolyzed used here can consequently also relate to these partially hydrolyzed structures.

The hydrolyzed silane is preferably applied in the form of an aqueous dispersion to the film. Drying then gives the inventive, adhesion-promoting layer.

The inventive coating described above is described in detail in EP-A-0 359 017, whose United States equivalent is U.S. Pat. No. 4,939,035, both of which are expressly incorporated herein by way of reference. That specification also gives information concerning other specific combinations of these hydrolyzable aminosilanes, and this is omitted here.

The coating can be applied to one or both sides of the film. However, it is also possible to provide only one side of the film with the inventive coating and to apply another coating on the opposite side.

By way of example, the inventive film has excellent suitability for packaging of food or drink (e.g. cheese, meat, etc). The film has excellent resistance to solvents and also to water. By way of example, it has been found that when the inventive film was extracted for two hours in steam at 121° C. the amount of extract was not measurable.

The total thickness of the inventive polyester film can vary within wide limits and depends on the intended use. It is generally from 6 to 300 µm, preferably from 8 to 200 µm, particular preferably from 10 to 100 µm, and if outer layers have been applied here the proportion made up by the base layer (B) is preferably from 40 to 99%, based on the total thickness.

The present invention also provides a process for production of the film. It encompasses
production of a single- or multilayer film comprised of a base layer B and of optionally present outer layer(s) A (and C) via extrusion or coextrusion;
coating of the film with the adhesion-promoting layer (preferably between the first and the second stretching step)
biaxial stretching of the film, and
heat-setting of the stretched film.

For production of the film, it is advantageous to introduce the respective components (component I=polyester homo- or copolymer or a mixture thereof, component II=pelletized poly(m-xyleneadipamide) (MXD6)) directly into the extruder. The materials can be extruded at about 250–300° C. For process-technology reasons (thorough mixing of the various polymers) it has proven particularly advantageous here to extrude the mixture in a twin-screw extruder with capability of devolatilization (although a single-screw extruder can also be used successfully in a less preferred variant).

The polymers for any outer layers (C and/or A) present are advantageously introduced into the (coextrusion) by way of other extruders; here again, twin-screw extruders are in principle to be preferred over single-screw extruders. The melts are shaped in a coextrusion die to give flat melt films and mutually superposed in layers. The multilayer film is then drawn off and solidified with the aid of a chill roller and, if appropriate, other rollers.

According to the invention, the biaxial stretching process is carried out sequentially. It is preferable here to begin by stretching longitudinally (i.e. in machine direction MD) and then to stretch transversely (i.e. perpendicularly to the machine direction, TD). By way of example, the longitudinal stretching can be carried out with the aid of two rollers rotating at different speeds corresponding to the desired stretching ratio. For the transverse stretching process use is generally made of an appropriate tenter frame.

The temperature at which the biaxial stretching process is carried out can vary within a relatively wide range, and depends on the desired properties of the film.

According to the invention, the film is stretched longitudinally (MDO) in a temperature range from, preferably, 80 (heating temperatures 80–130° C., depending on the stretching ratio and on the stretching process used) to 130° C. (stretching temperatures 80–130° C., depending on the stretching ratio and on the stretching process used), and the transverse stretching process is carried out in a temperature range from, preferably, 90 (start of the stretching process) to 140° C. (end of the stretching process).

According to the invention, the longitudinal stretching ratio is greater than 3.0, and is preferably in the range from 3.1:1 to 5.0:1, preferably in the range from 3.2:1 to 4.9:1, and particularly preferably in the range from 3.3:1 to 4.8:1. According to the invention, the transverse stretching ratio is greater than 3.0, and is preferably in the range from 3.2:1 to 5.0:1, preferably in the range from 3.3:1 to 4.8:1, and particularly preferably in the range from 3.4:1 to 4.6:1.

Figure 3:
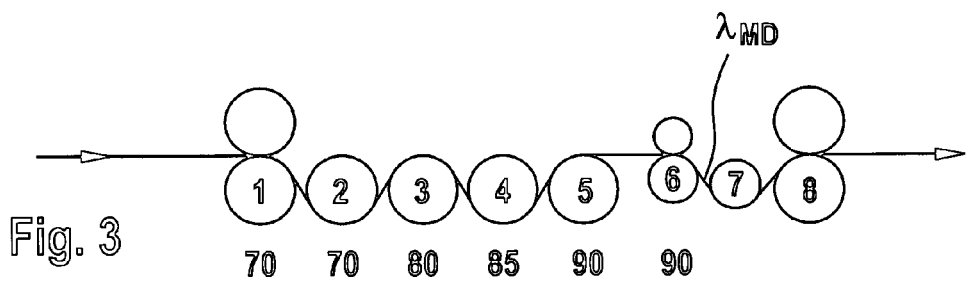
FIG. 3 is a schematic illustration of an exemplary single gap stretching process in accordance with the invention.

The longitudinal orientation of the film may be carried out by standard methods, e.g. with the aid of two rollers rotating at different speeds corresponding to the desired stretching ratio. This is called single-gap stretching. In this stretching process, the film is heated to the stretching temperature on two or more preheat rollers arranged in series, and is stretched by the desired stretching ratio $\lambda_{MD}$ (cf. FIG. 3) by means of two rollers running at different speeds. The temperature of the film during the orientation process is preferably in the range from 80 to 100° C., and depends on the material (mixing ratio of, by way of example, PET and MXD6) that is stretched, and on the stretching ratio $\lambda_{MD}$. The temperature of the film may be measured by means of IR, for example. Accordingly, the heating temperature is likewise preferably from 80 to 100° C., and in essence depends on the stretching temperature set. FIG. 3 shows the situation by way of example for an arrangement of 5 heating rollers (1–5) and of two stretching rollers (6–7). For a stretching temperature of 90° C., examples of the temperatures of the heating rollers are 70, 70, 80, 85, and 90° C.

Figure 4:
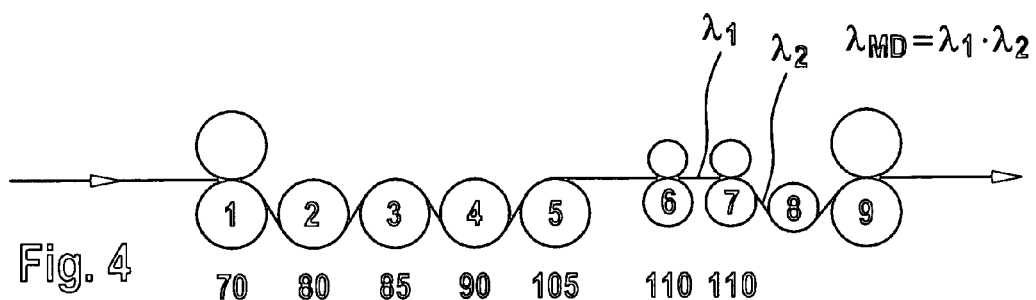
FIG. 4 is a schematic illustration of an exemplary two-stage stretching process in accordance with the invention.

The longitudinal orientation of the film is preferably carried out in a multistage process, particularly preferably in a two-stage process, e.g. with the aid of two or more rollers running at different speeds corresponding to the desired stretching ratio. In the case of the two-stage stretching process, the film is preferably oriented by the process published in EP-A-0 049 108, whose United States equivalent is U.S. Pat. No. 4,370,291 (cf. FIG. 4, which corresponds to FIG. 1 from EP-A-0 049 108). In this process, the film is heated to the stretching temperature on two or more preheat rollers arranged in series and is stretched by the desired stretching ratio $\lambda_{MD}$ by means of two or more rollers running at different speeds (3 rollers being used for stretching in the two-stage stretching process according to FIG. 1 of EP-A-0 049 108) (cf. FIG. 4). According to the invention, the longitudinal stretching ratio $\lambda_{MD}$ (where $\lambda_{MD}$ corresponds to the overall stretching ratio $\lambda_1 \cdot \lambda_2$ of EP-A-0 049 108) is greater than 3.0 and is preferably in the range from 3.1:1 to 5.0:1, preferably in the range from 3.2:1 to 4.9:1, and particularly preferably in the range from 3.3:1 to 4.8:1. The temperature of the film during the orientation process is preferably in the range from 80 to 130° C., and depends on the material (mixing ratio of, for example, PET and MXD6) that is being stretched, and on the stretching ratio $\lambda_{MD}$. Accordingly, the heating temperature is likewise from 80 to 130° C., and depends in essence on the stretching temperature set. FIG. 4 shows the situation for an arrangement of 5 heating rollers (1–5) and of three stretching rollers (6–8). For a stretching temperature of 110° C., examples of the temperatures of the heating rollers are 80, 80, 85, 90, 105, 110, and 110° C.

In the heat-setting process which follows, the film is kept at a temperature of about 150–250° C. for a period of about 0.1–10 s. The film is then wound up conventionally.

The hydrolyzed aminosilane layer is preferably applied in the form of an aqueous dispersion in-line during one of the three steps of film production, and specifically during:

a) the pre-stretching phase at the point between the take-off roller and the first stretching step, e.g. as described in GB Patent No. 1,411,564,
b) the intermediate phase at the location between the stretching procedures, after the first but prior to the second stretching process, as described in U.S. Pat. No. 4,214,035, or in
c) the post-stretching phase, following the biaxial stretching process but still prior to the wind-up of the film.

The heat used for the stretching or setting of the film is normally sufficient to evaporate water or other volatile substances and to dry the adhesion-promoting layer; an additional drying step is generally needed if the coating is applied downstream of the heating steps described.

In the preferred embodiment, the film is first stretched longitudinally prior to the coating process. In this preferred embodiment, the film is subjected to coating in any desired form of the prior art downstream of the longitudinal stretching process. Examples of the method here are roll coating, spray coating, or die coating (="slot coating").

In one preferred embodiment, the polyester film is coated via a gravure roller. The monoaxially oriented film or the appropriate surface can also be subjected to corona discharge prior to the coating process. Corona treatment weakens the hydrophobic character of the polyester film surface, and this allows the water-based adhesion-promoting mixture/dispersion to wet the surface more effectively and consequently improves the adhesion of the adhesion-promoting layer to the film surface.

The concentration of the hydrolyzed aminosilane applied in the form of an aqueous solution or dispersion to the film is preferably from 0.2 to 6% by weight, based on the unhydrolyzed aminosilane. About 0.2% by weight of a weak acid, such as acetic acid, phosphoric acid, or the like is then preferably added to promote the hydrolysis process. The preferred concentration of the hydrolyzed aminosilane in the aqueous solution/dispersion is in particular from 0.25 to 3.5 percent by weight. The preferred concentration is such as to give a final target dry application weight of about 2.5 mg/m$^2$ for the adhesion-promoting layer.

The coating may be applied to one or both sides of the polyester film, or the coating can be applied on one side and another coating can be applied on the reverse side. By way of example, this can be a hot-curing coating comprised of acrylate or of methacrylate, as described in U.S. Pat. No. 4,214,035.

The coating formulation may also comprise other ingredients, as long as these other ingredients do not reduce the adhesion-promoting properties of the hydrolyzed aminosilane. Among these are, by way of example, relatively small amounts of colloidal silica, inks, pH regulators, wetting aids, or the like.

Cut material coated with the adhesion-promoting layer and produced during film production can be chopped, mixed with virgin polymer, remelted, and extruded for production of oriented films. This film produced with significant amounts of coated regrind exhibits only very small reductions in the level of physical properties. Consequently, the film coated with the adhesion-promoting layer provides commercial advantages for film producers when compared with other coated films. By way of example, films which are coated with vinylidene-chloride-containing polymers (cf. U.S. Pat. No. 2,627,088 and U.S. Pat. No. 2,698,240) tend to degrade and discolor when used as regrind in the manner described.

Inventive laminates can be produced by the well-known extrusion coating process, where the molten polymer layer is applied continuously to the primed surface of the running film web. Laminates of polyester with polyethylene, with ethylene-vinyl acetate copolymers, with polyvinyl alcohol, with polyvinyl acetate, and with other polymers can readily be produced via extrusion coating.

An inventive PET film extrusion-coated with polyethylene has particularly valuable properties, e.g. good hot-sealability, or adhesion to other materials, such as aluminum foil.

The gloss of the film surfaces is preferably greater than 80 when the angle of incidence is 20°. In one preferred embodiment, the gloss of the film surfaces is more than 100, and in one particularly preferred embodiment it is more than 120.

The haze of the film is preferably smaller than 20%. In one preferred embodiment, the haze of the film is less than 15%, and in one particularly preferred embodiment it is less than 10%. Low haze makes the film particularly suitable for use as packaging.

Another advantage of the invention is that the production costs of the inventive film are not substantially above those of a film comprised of standard polyesters. It has also been ensured that an amount that is preferably from 5 to 60% by weight, in particular from 10 to 50% by weight, in each case based on the total weight of the film, of cut material arising directly in the plant during film production can be used again in the form of regrind for film production, without any significant resultant adverse effect on the physical properties of the film.

The inventive film is particularly suitable for packaging of foods or of other consumable items. It also has excellent suitability for metallizing or vacuum-coating with ceramic substances. It features excellent barrier properties with respect to gases such as oxygen and water vapor.

The table below (table 1) gives the most important inventive and preferred properties of the film.

TABLE 1

| Film or base layer | | preferred range | particularly preferred range | very particularly preferred range | Unit | Test method |
|---|---|---|---|---|---|---|
| Component I (= thermoplastic polyester) | | 55–95 | 60–95 | 65–95 | % by weight | |
| Component II (= poly(m-xylene-adipamide) (MXD6) | | 5–45 | 5–40 | 5–35 | % by weight | |
| Melt viscosity of MXD6 used | | <6000 | <5000 | <4000 | poise | in capillary rheometer, 280° |
| Biaxial orientation | | sequential | + first MD, then TD | + MD, two-stage | | |
| Longitudinal stretching, stretching ratio $\lambda_{MD}$ | | 3.1:1–5.0:1 | 3.2:1–4.9:1 | 3.3:1–4.8:1 | | |
| Transverse stretching, stretching ratio $\lambda_{TD}$ | | 3.2:1–5.0:1 | 3.3:1–4.8:1 | 3.4:1–4.6:1 | | |
| Filler concentration | | 0.02–1 | 0.04–0.8 | 0.06–0.6 | % by weight | |
| Film properties | | | | | | |
| Transmission coefficient for oxygen | | <45 | <40 | <30 | cm$^3$[12 μm]/ (m$^2$ · bar · d) | DIN 53 380, Part 3 |
| OTR of 12 μm thickness film | | <45 | <40 | <30 | cm$^3$/(m$^2$ · bar · d) | DIN 53 380, Part 3 |
| Film thickness | | 6–300 | 8–200 | 10–100 | μm | |
| Gloss of film (test angle = 20°) | | >80 | >100 | >120 | — | DIN 67 530 |
| Haze of film | | <20 | <15 | <10 | % | ASTM D1003-52 |
| Modulus of elasticity of film, | in MD | >3500 | >4000 | >4500 | N/mm$^2$ | DIN 53 457 |
| | in TD | >3500 | >4000 | >4500 | | |

TABLE 1-continued

| Film or base layer | | preferred range | particularly preferred range | very particularly preferred range | Unit | Test method |
|---|---|---|---|---|---|---|
| Ultimate tensile strength of film, | in MD | >160 | >170 | >180 | N/mm$^2$ | DIN 53 455 |
| | in TD | >200 | >210 | >220 | | |

Test Methods

The following methods were used to characterize the raw materials and the films:

(DIN=Deutsches Institut für Normung [German Institute for Standardization]ASTM=American Society for Testing and Materials)

(1) Oxygen Transmission (OTR=Oxygen Transmission Rate)

The level of the oxygen barrier was measured using an OXTRAN® 100 from Mocon Modern Controls (USA) to DIN 53 380, Part 3 (23° C., 50% relative humidity, on both sides of the film). OTR was always measured here on film thickness 12 µm.

(2) Haze

Haze of the untreated film was determined to ASTM D1003–52.

(3) SV (Standard Viscosity)

Standard viscosity SV (DCA) is measured in dichloroacetic acid by a method based on DIN 53726. Intrinsic viscosity (IV) is calculated from standard viscosity as follows:

$$IV(DCA)=6.907\cdot 10^{-4}SV(DCA)+0.063096$$

(4) Gloss

Gloss of the uncoated film was determined to DIN 67530. Reflectance was measured, this being an optical value characteristic of a film surface. Using a method based on the standards ASTM D523–78 and ISO 2813, the angle of incidence was set at 20° or 60°. A beam of light hits the flat test surface at the set angle of incidence and is reflected or scattered by the surface. A proportional electrical variable is displayed, representing light rays hitting the photoelectronic detector. The value measured is dimensionless and has to be stated together with the angle of incidence. The gloss test values given in the examples were measured at an angle of incidence of 20°.

(5) Roughness

The roughness $R_a$ of the uncoated film was determined to DIN 4768 with a cut-off of 0.25 mm. This test was not carried out on a glass plate, but in a ring.

In the ring method, the film is clamped into a ring so that neither of the two surfaces is in contact with a third surface (e.g. glass).

(6) Modulus of Elasticity

Modulus of elasticity is determined to DIN 53 457 or ASTM 882.

(7) Ultimate Tensile Strength, Tensile Strain at Break

Ultimate tensile strength and tensile strain at break are determined to DIN 53 455.

(8) Coefficient of Friction

The coefficient of friction was determined using DIN 53375 or ASTM-D 1894.

EXAMPLES

The following examples illustrate the invention. The products used (trade marks and producer) are in each case stated only once, and then also apply to the subsequent examples.

Example 1

N-2-(aminoethyl)-3-aminopropyltrimethoxysilane (AE-APTMS) (supplied as Z-6020 from Dow Corning and as A-1120 from Union Carbide) was dispersed at a concentration of 2.0% by weight in normal tap water. To promote the hydrolysis process here, acetic acid was added at a concentration of 0.2% by weight.

Alongside this, chips comprised of polyethylene terephthalate (prepared by way of the transesterification process using Mn as transesterification catalyst, Mn concentration in polymer: 100 ppm, dried at a temperature of 150° C. to a residual moisture level below 100 ppm, and poly(m-xyleneadipamide) (MXD6), likewise dried at a temperature of 150° C. were introduced in a mixing ratio of 90:10 into the extruder (twin-screw extruder with two vents), and a single-layer film was extruded.

| Film structure | |
|---|---|
| 10% by weight | poly(m-xyleneadipamide) (MXD6) from Mitsubishi Gas Chemical Co., product name NYLON ® MXD6 6007, with melt viscosity of 5000 poise |
| 80% by weight | polyethylene terephthalate 4023 from KoSa, Germany, with SV 800 |
| 10% by weight | polyester from KoSa with SV 800, comprised of 99% by weight of polyethylene terephthalate 4023 from KoSa and 1.0% by weight of silica particles (SYLYSIA ® 320 from Fuji, Japan) with $d_{50}$ 2.5 µm. |

The longitudinally stretched film was corona-treated with corona discharge equipment (Softal, Hamburg, Germany), and then was reverse-gravure coated with the hydrolyzed aminosilane solution/dispersion prepared as described above.

The corona-treated, longitudinally stretched, coated film was dried at a temperature of about 110° C. The film was then stretched transversely with a stretching ratio of 3.8×1, to produce a biaxially oriented film. The thickness of the stretched film was 12 µm. The biaxially oriented film was then heat-set at a temperature of 230° C. The dry application weight of the coating was about 2.5 mg/m$^2$.

The production conditions in the individual steps of the process are as follows:

| Extrusion | Max. temperature | 280° C. |
|---|---|---|
| | Take-off roller temperature | 25° C. |

-continued

| Longitudinal stretching | Longitudinal stretching ratio $\lambda_{MDO}$ | 4.0 |
| --- | --- | --- |
| | $\lambda_1$ | 1.75 |
| | Stretching temperature during 1st stretching process | 115° C. |
| | $\lambda_2$ | 2.3 |
| | Stretching temperature during 2nd stretching process | 113° C. |
| | Heating temperature 1st roller | 70° C. |
| | final roller | 115° C. |
| Transverse stretching | Stretching temperature start | 110° C. |
| | end | 134° C. |
| | Transverse stretching ratio | 3.8 |
| Setting | Temperature | 230° C. |
| | Duration | 3 s |

The surfaces of the film had the high gloss demanded, and the film had the low haze demanded, the low OTR demanded, and the high mechanical strength demanded. The film was moreover capable of very efficient production, i.e. without break-offs, and also exhibited the desired processing behavior (inter alia good winding quality, e.g. no blocking points, no longitudinal corrugations, no raised edges).

As described in more detail in EP-A-0 359 017, whose United States equivalent is U.S. Pat. No. 4,939,035 (see examples), the coated film was run through an extrusion coater, and the adhesion-promoting surface was coated with 25 μm of low-density polyethylene (LDPE) (USI polymer with melt index 14). A melt temperature was 325° C. and the die height above the film was about 200 mm. No additional corona treatment was carried out, and no additional adhesion-promoting layer was applied.

The strength of adhesion to the polyethylene was 18 mN/mm, when tested to ASTM D882 and E4. The adhesion of the polyethylene to the polyester film here was so good that it was impossible to separate the two layers from one another in order carry out a peel test. Neither hot water nor toluene, nor tetrahydrofuran (THF) could achieve separation at the PET/LDPE interface.

Example 2

As in Example 1, N-2-(aminoethyl)-3-aminopropyltrimethoxysilane was dispersed at a concentration of 2.0% by weight in normal tap water. This example therefore used the adhesion-promoting layer of Example 1.

Chips comprised of a copolyester comprised of terephthalate units and of isophthalate units, and of ethylene glcyol units (the proportion of ethylene terephthalate being 90 mol % and the proportion of ethylene isophthalate being 10 mol %, prepared by way of the transesterification process using Mn as transesterification catalyst, Mn concentration in polymer: 100 ppm; dried at a temperature of 100° C. to a residual moisture level below 100 ppm) and poly(m-xyleneadipamide) (MXD6), likewise dried at a temperature of 100° C., were introduced in a mixing ratio of 90:10 into the extruder (twin-screw extruder), and a single-layer film was extruded. The film was oriented longitudinally (in two stages) and transversely, the product being a transparent film with total thickness 12 μm.

As described in Example 1, the longitudinally stretched film was reverse-gravure coated with the hydrolyzed aminosilane solution. The other steps of the process were carried out as in Example 1. Here too, the dry application rate of the coating was about 2.5 mg/m².

Film structure

| | | |
| --- | --- | --- |
| 10% by weight | poly(m-xyleneadipamide) (MXD6) from Mitsubishi Gas Chemical Co., product name NYLON ® MXD6 6007, with melt viscosity of 5000 poise | |
| 80% by weight | polyester copolymer (ethylene terephthalate 90 mol %, ethylene isophthalate 10 mol %, KoSa, Germany) with SV 800 | |
| 10% by weight | polyester from KoSa with SV 800, comprised of 99% by weight of polyester copolymer (ethylene terephthalate 90 mol %, ethylene isophthalate 10 mol % from KoSa), and 1.0% by weight of silica particles (SYLYSIA ® 320 from Fuji, Japan) with $d_{50}$ 2.5 μm. | |

The production conditions in the individual steps of the process are as follows:

| Extrusion | Max. temperature | 270° C. |
| --- | --- | --- |
| | Take-off roller temperature | 25° C. |
| Longitudinal stretching | Longitudinal stretching ratio $\lambda_{MDO}$ | 4.2 |
| | $\lambda_1$ | 1.83 |
| | Stretching temperature during 1st stretching process | 112° C. |
| | $\lambda_2$ | 2.3 |
| | Stretching temperature during 2nd stretching process | 106° C. |
| | Heating temperature 1st roller | 70° C. |
| | final roller | 112° C. |
| Transverse stretching | Stretching temperature start | 105° C. |
| | end | 127° C. |
| | Transverse stretching ratio | 3.8 |
| Setting | Temperature | 225° C. |
| | Duration | 3 s |

The surface of the film had the high gloss demanded, and the film had the low haze demanded, the low OTR demanded, and the high mechanical strength demanded. The film was moreover capable of very efficient production, i.e. without break-offs, and also exhibited the desired processing behavior (inter alia good winding quality, e.g. no blocking points, no longitudinal corrugations, no raised edges).

Here too, the coated film was run through an extrusion coater and coated with 25 μm of low-density polyethylene, using a procedure identical with that of Example 1. The strength of adhesion to the polyethylene was about 19 mN/mm, when tested to ASTM D882 and E4.

In the other Examples, the film was coated as in Examples 1 and 2, and the results here were comparably good adhesion values. The other Examples therefore merely describe the constitution of the polyester film, inclusive of the process conditions used.

Example 3

The mixing ratio of MXD6 and polyethylene terephthalate was changed from that of Example 1. In this Example, chips comprised of polyethylene terephthalate and poly(m-xyleneadipamide) (MXD6, dried) were introduced in a mixing ratio of 85:15 into the extruder (twin-screw extruder), and a single-layer film was extruded. The film was oriented longitudinally (in two stages) and transversely, the product being a transparent film with total thickness 12 μm.

Film structure

| | |
|---|---|
| 15% by weight | poly(m-xyleneadipamide) (MXD6) from Mitsubishi Gas Chemical Co., product name NYLON ® MXD6 6007, with melt viscosity of 5000 poise |
| 75% by weight | polyethylene terephthalate 4023 from KoSa, Germany, with SV 800 |
| 10% by weight | polyester from KoSa with SV 800, comprised of 99% by weight of polyethylene terephthalate 4023 from KoSa and 1.0% by weight of silica particles (SYLYSIA ® 320 from Fuji, Japan) with $d_{50}$ 2.5 μm. |

The production conditions in the individual steps of the process are as follows:

| | | |
|---|---|---|
| Extrusion | Max. temperature | 280° C. |
| | Take-off roller temperature | 25° C. |
| Longitudinal stretching | Longitudinal stretching ratio $\lambda_{MDO}$ | 3.8 |
| | $\lambda_1$ | 1.65 |
| | Stretching temperature during 1st stretching process | 115° C. |
| | $\lambda_2$ | 2.3 |
| | Stretching temperature during 2nd stretching process | 113° C. |
| | Heating temperature 1st roller | 70° C. |
| | final roller | 115° C. |
| Transverse stretching | Stretching temperature start | 110° C. |
| | end | 137° C. |
| | Transverse stretching ratio | 3.8 |
| Setting | Temperature | 230° C. |
| | Duration | 3 s |

The surface of the film had the high gloss demanded, and the film had the low haze demanded, the low OTR demanded, and the high mechanical strength demanded. The film was moreover capable of very efficient production, i.e. without break-offs, and also exhibited the desired processing behavior, as in the preceding Examples.

Example 4

The mixing ratio of MXD6 and polyethylene terephthalate was changed from that of Example 1. In this Example, chips comprised of polyethylene terephthalate and poly(m-xyleneadipamide) (MXD6, dried) were introduced in a mixing ratio of 75:25 into the extruder (twin-screw extruder), and a single-layer film was extruded. The film was oriented longitudinally (in two stages) and transversely, the product being a transparent film with total thickness 12 μm.

Film structure

| | |
|---|---|
| 25% by weight | poly(m-xyleneadipamide) (MXD6) from Mitsubishi Gas Chemical Co., product name NYLON ® MXD6 6007, with melt viscosity of 5000 poise |
| 65% by weight | polyethylene terephthalate 4023 from KoSa, Germany, with SV 800 |
| 10% by weight | polyester from KoSa with SV 800, comprised of 99% by weight of polyethylene terephthalate 4023 from KoSa and 1.0% by weight of silica particles (SYLYSIA ® 320 from Fuji, Japan) with $d_{50}$ 2.5 μm. |

The production conditions in the individual steps of the process are as follows:

| | | |
|---|---|---|
| Extrusion | Max. temperature | 280° C. |
| | Take-off roller temperature | 25° C. |
| Longitudinal stretching | Longitudinal stretching ratio $\lambda_{MDO}$ | 3.7 |
| | $\lambda_1$ | 1.61 |
| | Stretching temperature during 1st stretching process | 118° C. |
| | $\lambda_2$ | 2.3 |
| | Stretching temperature during 2nd stretching process | 115° C. |
| | Heating temperature 1st roller | 70° C. |
| | final roller | 118° C. |
| Transverse stretching | Stretching temperature start | 110° C. |
| | end | 139° C. |
| | Transverse stretching ratio | 3.8 |
| Setting | Temperature | 230° C. |
| | Duration | 3 s |

The surface of the film had the high gloss demanded, and the film had the low haze demanded, the low OTR demanded, and the high mechanical strength demanded. The film was moreover capable of very efficient production, i.e. without break-offs, and also exhibited the desired processing behavior, as in the preceding Examples.

Example 5

The mixing ratio of MXD6 and polyethylene terephthalate was changed from that of Example 1. In this Example, chips comprised of polyethylene terephthalate and poly(m-xyleneadipamide) (MXD6, dried) were introduced in a mixing ratio of 60:40 into the extruder (twin-screw extruder), and a single-layer film was extruded. The film was oriented longitudinally (in two stages) and transversely, the product being a transparent film with total thickness 12 μm.

Film structure

| | |
|---|---|
| 40% by weight | poly(m-xyleneadipamide) (MXD6) from Mitsubishi Gas Chemical Co., product name NYLON ® MXD6 6007, with melt viscosity of 5000 poise |
| 50% by weight | polyethylene terephthalate 4023 from KoSa, Germany, with SV 800 |
| 10% by weight | polyester from KoSa with SV 800, comprised of 99% by weight of polyethylene terephthalate 4023 from KoSa and 1.0% by weight of silica particles (SYLYSIA ® 320 from Fuji, Japan) with $d_{50}$ 2.5 μm. |

The production conditions in the individual steps of the process are as follows:

| | | |
|---|---|---|
| Extrusion | Max. temperature | 280° C. |
| | Take-off roller temperature | 25° C. |
| Longitudinal stretching | Longitudinal stretching ratio $\lambda_{MDO}$ | 3.6 |
| | $\lambda_1$ | 1.6 |
| | Stretching temperature during 1st stretching process | 120° C. |
| | $\lambda_2$ | 2.25 |
| | Stretching temperature during 2nd stretching process | 118° C. |
| | Heating temperature 1st roller | 70° C. |
| | final roller | 120° C. |

-continued

| | | |
|---|---|---|
| Transverse stretching | Stretching temperature start | 110° C. |
| | end | 140° C. |
| | Transverse stretching ratio | 3.7 |
| Setting | Temperature | 230° C. |
| | Duration | 3 s |

The surface of the film had the high gloss demanded, and the film had the low haze demanded, the low OTR demanded, and the high mechanical strength demanded. The film was moreover capable of very efficient production, i.e. without break-offs, and also exhibited the desired processing behavior, as in the preceding Examples.

Example 6

Coextrusion is now used to produce a three-layer film with ABA structure, unlike in Example 1. The constitution of the base layer (B) here was unchanged from Example 1. To this end, chips comprised of polyethylene terephthalate and of a filler were also introduced into the extruder (twin-screw extruder) for the outer layers (A). This gave a transparent, three-layer film with ABA structure and with a total thickness of 12 μm. The thickness of each of the outer layers (A) was 1.0 μm.

Outer Layer (A):

| | |
|---|---|
| 100% by weight | of polyester from KoSa with SV 800, comprised of 99.5% by weight of polyethylene terephthalate from KoSa and 0.5% by weight of silica particles (SYLYSIA ® 320 from Fuji, Japan) with $d_{50}$ of 2.5 μm |

The production conditions in the individual steps of the process were similar to those in Example 1. The film had the low haze demanded and the low OTR demanded. The film was also capable of very efficient production, i.e. without break-off, and also exhibited the desired processing behavior.

Comparative Example

A film was produced corresponding to example 1 of JP 2001-001399. The roughness values for this film are too high, and the gloss of the film, and in particular the mechanical properties, are not within the inventive range. The wound-up roll also exhibits blocking points (points where there was blocking of the laps of film) due to absence of fillers within the film.

The properties and the structure of the films produced in the Examples and in the comparative examples (CE) are given in table 2.

TABLE 2

| | | Film thickness μm | Film structure | Proportion of MXD6 in film/base layer % | Haze % | Gloss of both surfaces | Modulus of elasticity in | | Ultimate tensile strength | |
|---|---|---|---|---|---|---|---|---|---|---|
| | | | | | | | MDO N/mm² | TDO | MDO N/mm² | TDO |
| Examples | 1 | 12 | B | 10 | 5 | 130 | 4800 | 5200 | 170 | 220 |
| | 2 | 12 | B (IPA) | 10 | 4 | 140 | 4600 | 5000 | 160 | 200 |
| | 3 | 12 | B | 15 | 6 | 130 | 4900 | 5400 | 180 | 230 |
| | 4 | 12 | B | 25 | 7 | 130 | 4900 | 5500 | 190 | 230 |
| | 5 | 12 | B | 40 | 9 | 130 | 5100 | 6000 | 200 | 230 |
| | 6 | 12 | ABA | 10 | 3.8 | 150 | 4600 | 5000 | 160 | 200 |
| CE | 1 | 12 | B | 20 | 8 | 75 | 3300 | 3400 | 150 | 160 |

| | | Tensile strain at break | | OTR cm³/m² · bar · d | Roughness of both surfaces μm | Coefficient of friction of both surfaces % | Adhesion between PE layer and PET film mN/mm² |
|---|---|---|---|---|---|---|---|
| | | MDO | TDO % | | | | |
| Examples | 1 | 100 | 80 | 40 | 70 | 0.42 | 18 |
| | 2 | 120 | 90 | 42 | 60 | 0.46 | 19 |
| | 3 | 120 | 95 | 35 | 75 | 0.42 | 20 |
| | 4 | 120 | 95 | 15 | 75 | 0.4 | 19 |
| | 5 | 120 | 95 | 5 | 80 | 0.4 | 18 |
| | 6 | 120 | 90 | 40 | 60 | 0.45 | 20 |
| CE | 1 | 130 | 100 | 22 | 100 | >1 | <2 |

The invention claimed is:

1. A biaxially oriented polyester film comprising
   a) thermoplastic polyester and poly(m-xyleneadipamide) (MXD6), which exhibits
   b) a modulus of elasticity of at least 3500 N/mm² in both orientation directions, and
   c) an adhesion-promoting layer coated on at least one surface, said adhesion-promoting layer comprising at least one hydrolyzed amino-functional silane.

2. The polyester film as claimed in claim 1, which further comprises fillers.

3. The polyester film as claimed in claim 2, which comprises from 0.02 to 1% by weight of said fillers.

4. The polyester film as claimed in claim 1, which comprises from 5 to 45% by weight of poly(m-xyleneadipamide).

5. The polyester film as claimed in claim 1, wherein the melt viscosity of the poly(m-xyleneadipamide) is smaller than 6000 poise.

6. The polyester film as claimed in claim 1, which comprises at least 55% by weight of thermoplastic polyester.

7. The polyester film as claimed in claims 1, wherein the thermoplastic polyester contains terephthalic acid units and/or isophthalic acid units and/or naphthalene-2,6-dicarboxylic acid units.

8. The polyester film as claimed in claim 1, wherein the thermoplastic polyester contains isophthalic acid units, terephthalic acid units, and ethylene glycol units.

9. The polyester film as claimed in claim 1, wherein the thermoplastic polyester used comprises polyethylene terephthalate.

10. The polyester film as claimed in claim 1, said film comprising a base layer (B) and of one or two outer layers (A) and (C), where the outer layers (A) and (C) may be identical or different.

11. The polyester film as claimed in claim 10, wherein the outer layers (A) and/or (C) comprise the thermoplastic polyester used for the base layer (B).

12. The polyester film as claimed in claim 10, wherein the polymer used for the outer layers (A) and/or (C) comprises polyethylene terephthalate or a polyester copolymer which contains isophthalic acid units, terephthalic acid units, and ethylene glycol units.

13. The polyester film as claimed in claim 1, wherein the hydrolyzed amino-functional silane is derived from unhydrolyzed amino-functional silane, said unhydrolyzed, amino-functional silane comprising a compound of the formula $(R^1)_a Si(R^2)_b (R^3)_c$, where $R^1$ is a functional radical having at least one primary amino group, $R^2$ is a hydrolyzable radical, such as $(C_1-C_8)$-alkoxy, acetoxy, or halide, $R^3$ is a non-hydrolyzable radical, such as $(C_1-C_8)$-alkyl or a phenyl group, a and b, independently of one another, are greater than or equal to 1, c is greater than or equal to 0, and $a+b+c=4$.

14. The polyester film as claimed in claim 13, wherein the unhydrolyzed, amino-functional silane is N-2-(aminoethyl)-3-amino-propyltrimethoxysilane.

15. The polyester film as claimed in claim 1, whose gloss is greater than 80.

16. The polyester film as claimed in claim 1, wherein, film having a thickness of 12 μm, exhibit an oxygen transmission (OTR) smaller than 45 $cm^3 \cdot m^{-2} \cdot d^{-1} \cdot bar^{-1}$.

17. The polyester film as claimed in claim 1, said film exhibits a haze of smaller than 20%.

18. The polyester film as claimed in claim 1, wherein said film is produced in a sequential stretching process.

19. A process for production of a polyester film as claimed in claim 1, said process comprising the steps of
    a) extruding or coextruding the film,
    b) coating of the film,
    c) sequentially stretching the film, and
    d) heat-setting the stretched film.

20. The process as claimed in claim 19, wherein the sequential stretching comprises first orienting the film in the machine direction and then orienting the film in the transverse direction.

21. The process as claimed in claim 20, wherein the orienting in the machine direction takes place in 2 stages.

22. The process as claimed in claim 19, wherein the coating step comprises applying an adhesion-promoting layer in the form of an aqueous dispersion to the film.

23. Packaging material comprising a polyester film as claimed claim 1.

24. Packaging material as claimed in claim 23, wherein said packaging is food packaging or consumable item packaging.

25. A laminate comprising polyester film according to claim 1 and of one or more polymers extruded onto the adhesion-promoting layer of the polyester film.

26. A laminate as claimed in claim 25, wherein the extruded polymers comprise polyesters, copolyesters, polyolefins, polyamides, polyethylene-vinyl acetates, polyvinyl alcohols, or polyvinyl acetates.

27. A process to form a laminate as claimed in claim 25.

28. Packaging material comprising a laminate as claimed in claim 25.

* * * * *